United States Patent
Preisler et al.

(10) Patent No.: US 9,770,849 B2
(45) Date of Patent: Sep. 26, 2017

(54) METHOD OF MAKING A SANDWICH-TYPE, COMPRESSION-MOLDED, COMPOSITE COMPONENT HAVING IMPROVED SURFACE APPEARANCE

(71) Applicant: Global IP Holdings, LLC, Sterling Heights, MI (US)

(72) Inventors: Darius J. Preisler, Macomb, MI (US); Christopher A. Heikkila, Washington Township, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 907 days.

(21) Appl. No.: 13/762,956

(22) Filed: Feb. 8, 2013

(65) Prior Publication Data
US 2014/0225296 A1   Aug. 14, 2014

(51) Int. Cl.
| | |
|---|---|
| *B29C 43/18* | (2006.01) |
| *B29C 43/10* | (2006.01) |
| *B29C 43/56* | (2006.01) |

(52) U.S. Cl.
CPC .............. *B29C 43/18* (2013.01); *B29C 43/10* (2013.01); *B29C 2043/182* (2013.01); *B29C 2043/563* (2013.01)

(58) Field of Classification Search
CPC .................................. B29C 43/18; B29C 51/18
See application file for complete search history.

(56) References Cited

U.S. PATENT DOCUMENTS

| | | | |
|---|---|---|---|
| 3,568,254 A | 3/1971 | Stolki | |
| 3,651,563 A | 3/1972 | Volkmann | |
| 3,750,525 A | 8/1973 | Waters et al. | |
| 3,955,266 A | 5/1976 | Honami et al. | |
| 4,175,995 A | 11/1979 | Walter | |
| 4,204,822 A * | 5/1980 | Hewitt | 425/210 |
| 4,550,854 A | 11/1985 | Schellenberg | |
| 4,717,612 A | 1/1988 | Shackelford | |
| 4,836,380 A | 6/1989 | Walter et al. | |
| 4,941,785 A | 7/1990 | Witten | |
| 5,143,778 A * | 9/1992 | Shuert | 428/213 |

(Continued)

OTHER PUBLICATIONS

Notice of Allowance and Fee(s) Due; related U.S. Appl. No. 14/087,591; date mailed Mar. 12, 2015.

(Continued)

*Primary Examiner* — Matthew Daniels
(74) *Attorney, Agent, or Firm* — Brooks Kushman P.C.

(57) ABSTRACT

A method of making a sandwich-type, compression-molded, composite component having improved surface appearance is provided. Resin skins and a core of a blank or stack of sandwich materials are heated to a softening temperature of the resin. A compression mold is provided including component-forming, upper and lower dies with opposing molding surfaces cooperating to define a mold cavity. The heated blank or stack is allowed to cool in the mold cavity until inner surfaces of the skins are bonded to top and bottom surfaces of the core to seal core cavities. Air in the sealed cavities urges softened portions of the skins inwardly towards the cavities of the core as the air in the cavities cools. A vacuum is applied at a first outer surface of the blank or stack in the mold cavity sufficient to prevent debossing and improve appearance of the first outer surface.

20 Claims, 2 Drawing Sheets

(56) References Cited

U.S. PATENT DOCUMENTS

| | | |
|---|---|---|
| 5,198,175 A | 3/1993 | Kato et al. |
| 5,217,563 A | 6/1993 | Niebling et al. |
| 5,316,604 A | 5/1994 | Fell |
| 5,370,521 A | 12/1994 | McDougall |
| 5,417,179 A | 5/1995 | Niemier et al. |
| 5,474,008 A | 12/1995 | Vespoli et al. |
| 5,502,930 A | 4/1996 | Burkette et al. |
| 5,700,050 A | 12/1997 | Gonas |
| 5,911,360 A | 6/1999 | Schellenberg |
| 5,915,445 A | 6/1999 | Rauenbusch |
| 5,928,735 A | 7/1999 | Padmanabhan et al. |
| 6,050,630 A | 4/2000 | Hochet |
| 6,102,464 A | 8/2000 | Schneider et al. |
| 6,280,551 B1 | 8/2001 | Hilligoss |
| 6,435,577 B1 | 8/2002 | Renault |
| 6,537,413 B1 | 3/2003 | Hochet et al. |
| 6,546,694 B2 | 4/2003 | Clifford |
| 6,655,299 B2 | 12/2003 | Preisler et al. |
| 6,682,675 B1 | 1/2004 | Vandangeot et al. |
| 6,682,676 B1 | 1/2004 | Renault et al. |
| 6,748,876 B2 | 6/2004 | Preisler et al. |
| 6,790,026 B2 | 9/2004 | Vandangeot et al. |
| 6,823,803 B2 | 11/2004 | Preisler |
| 6,843,525 B2 | 1/2005 | Preisler |
| 6,890,023 B2 | 5/2005 | Preisler et al. |
| 6,981,863 B2 | 1/2006 | Renault et al. |
| 7,090,274 B1 | 8/2006 | Khan et al. |
| 7,121,128 B2 | 10/2006 | Kato et al. |
| 7,204,056 B2 | 4/2007 | Sieverding |
| 7,393,036 B2 | 7/2008 | Bastian et al. |
| 7,419,713 B2 | 9/2008 | Wilkens et al. |
| 7,909,379 B2 | 3/2011 | Winget et al. |
| 7,919,031 B2 | 4/2011 | Winget et al. |
| 8,052,237 B2 | 11/2011 | Althammer et al. |
| 8,062,762 B2 | 11/2011 | Stalter |
| 8,117,972 B2 | 2/2012 | Winget et al. |
| 8,262,968 B2 | 9/2012 | Smith et al. |
| 8,622,456 B2 | 1/2014 | Preisler et al. |
| 8,651,549 B2 | 2/2014 | Raffel et al. |
| 8,690,233 B2 | 4/2014 | Preisler et al. |
| 8,808,833 B2 | 8/2014 | Preisler et al. |
| 8,834,985 B2 | 9/2014 | Preisler et al. |
| 9,302,315 B2 | 4/2016 | Verbeek et al. |
| 9,364,975 B2 | 6/2016 | Preisler et al. |
| 2003/0197400 A1* | 10/2003 | Preisler et al. ............... 296/214 |
| 2005/0189674 A1 | 9/2005 | Hochet et al. |
| 2006/0121244 A1 | 6/2006 | Godwin et al. |
| 2006/0255611 A1 | 11/2006 | Smith et al. |
| 2008/0105866 A1 | 5/2008 | Jeong et al. |
| 2008/0169678 A1 | 7/2008 | Ishida et al. |
| 2008/0193256 A1 | 8/2008 | Neri |
| 2010/0026031 A1 | 2/2010 | Jouraku |
| 2010/0170746 A1 | 7/2010 | Restuccia et al. |
| 2011/0315310 A1 | 12/2011 | Trevisan et al. |
| 2013/0278002 A1 | 10/2013 | Preisler et al. |
| 2013/0278003 A1 | 10/2013 | Preisler et al. |
| 2013/0278009 A1 | 10/2013 | Preisler et al. |
| 2013/0278015 A1 | 10/2013 | Preisler et al. |
| 2013/0278018 A1 | 10/2013 | Preisler et al. |
| 2013/0278019 A1 | 10/2013 | Preisler et al. |
| 2013/0278020 A1 | 10/2013 | Preisler et al. |
| 2013/0280469 A1 | 10/2013 | Preisler et al. |
| 2013/0280472 A1 | 10/2013 | Preisler et al. |
| 2013/0280473 A1 | 10/2013 | Preisler et al. |
| 2013/0312652 A1 | 11/2013 | Preisler et al. |
| 2013/0316123 A1 | 11/2013 | Preisler et al. |
| 2013/0341971 A1 | 12/2013 | Masini et al. |
| 2014/0077518 A1 | 3/2014 | Preisler et al. |
| 2014/0077530 A1 | 3/2014 | Preisler et al. |
| 2014/0077531 A1 | 3/2014 | Preisler et al. |
| 2014/0145465 A1 | 5/2014 | Preisler et al. |
| 2014/0145470 A1 | 5/2014 | Preisler et al. |
| 2014/0147617 A1 | 5/2014 | Preisler et al. |
| 2014/0147622 A1 | 5/2014 | Preisler et al. |
| 2014/0225296 A1 | 8/2014 | Preisler et al. |
| 2015/0130105 A1 | 5/2015 | Preisler et al. |
| 2015/0130220 A1 | 5/2015 | Preisler et al. |
| 2015/0130221 A1 | 5/2015 | Preisler et al. |
| 2015/0130222 A1 | 5/2015 | Preisler et al. |
| 2015/0132532 A1 | 5/2015 | Preisler et al. |
| 2016/0059446 A1 | 3/2016 | Lofgren |

OTHER PUBLICATIONS

Non-Final Office Action, related U.S. Appl. No. 13/762,879; dated Feb. 13, 2015.
Non-Final Office Action, related U.S. Appl. No. 13/479,974; dated Feb. 13, 2015.
Notice of Allowance and Fee(s) Due; related U.S. Appl. No. 13/603,552; dated Feb. 18, 2015.
Office Action; Related U.S. Appl. No. 13/479,974; Date of mailing Oct. 15, 2014.
Office Action; related U.S. Appl. No. 13/479,974; date of mailing Mar. 20, 2014.
Office Action; related U.S. Appl. No. 13/686,362; date of mailing Mar. 25, 2014.
Office Action; related U.S. Appl. No. 13/523,253; date of mailing Mar. 25, 2014.
Office Action; related U.S. Appl. No. 13/688,972; date of mailing Mar. 28, 2014.
Office Action; related U.S. Appl. No. 13/687,232; date of mailing Mar. 28, 2014.
Office Action; related U.S. Appl. No. 13/689,809; date of mailing Mar. 31, 2014.
Office Action; related U.S. Appl. No. 13/687,213; date of mailing Mar. 31, 2014.
Office Action; related U.S. Appl. No. 13/690,265; date of mailing Mar. 31, 2014.
Office Action; related U.S. Appl. No. 13/762,904; date of mailing Apr. 8, 2014.
Office Action; related U.S. Appl. No. 13/762,800; date of mailing Apr. 8, 2014.
Office Action; related U.S. Appl. No. 13/762,861; date of mailing Apr. 9, 2014.
Office Action; related U.S. Appl. No. 13/690,566; date of mailing Apr. 9, 2014.
Office Action; related U.S. Appl. No. 13/762,832; date of mailing Apr. 11, 2014.
Office Action; related U.S. Appl. No. 13/762,921; date of mailing Apr. 14, 2014.
Notice of Allowance; related U.S. Appl. No. 13/686,388; date of mailing Apr. 15, 2014.
Related U.S. Appl. No. 13/690,566, filed Nov. 30, 2012.
Related U.S. Appl. No. 13/762,921, filed Feb. 8, 2013.
Related U.S. Appl. No. 13/762,956, filed Feb. 8, 2013.
Office Action; related U.S. Appl. No. 13/453,201 (now U.S. Pat. No. 8,690,233); date of mailing Nov. 20, 2013.
Office Action; related U.S. Appl. No. 13/523,209 (now U.S. Pat. No. 8,622,456) date of mailing Apr. 29, 2013.
Office Action; related U.S. Appl. No. 14/087,563; notification date Jul. 20, 2015.
Office Action; related U.S. Appl. No. 13/762,879; notification date Jul. 31, 2015.
Notice of Allowance and Fee(s) Due; related U.S. Appl. No. 14/087,579; date mailed Aug. 3, 2015.
Office Action; U.S. Appl. No. 13/762,956; notification date Apr. 17, 2015.
Office Action; U.S. Appl. No. 14/603,413; notification date Apr. 23, 2015.
Notice of Allowance and Fee(s) Due; related U.S. Appl. No. 14/087,563; date of mailing Mar. 3, 2016.
Office Action; related U.S. Appl. No. 14/603,430; notification date Sep. 14, 2016.
Office Action; related U.S. Appl. No. 14/603,404; notification date Aug. 25, 2016.
Corrected Notice of Allowability; related U.S. Appl. No. 14/603,401; dated Jun. 23, 2016.

(56) References Cited

OTHER PUBLICATIONS

Office Action; related U.S. Appl. No. 14/603,418; dated Jun. 16, 2016.
Notice of Allowance and Fee(s) Due; related U.S. Appl. No. 14/444,164; dated Jul. 15, 2016.
Office Action; related U.S. Appl. No. 14/603,397; dated Jul. 21, 2016.

\* cited by examiner

METHOD OF MAKING A SANDWICH-TYPE, COMPRESSION-MOLDED, COMPOSITE COMPONENT HAVING IMPROVED SURFACE APPEARANCE

CROSS-REFERENCE TO RELATED APPLICATION

This application is related to U.S. patent application Ser. No. 13/762,921 entitled "Sandwich-Type Composite Component Having Imprinted 3-D Structures Which Provide At Least One Pattern at an Outer Surface of the Component" filed on the same day as this application, now U.S. Pat. No. 8,834,985, issued Sep. 16, 2014.

TECHNICAL FIELD

This invention relates, in general, to methods of making compression-molded, composite components and, in particular, to methods of making sandwich-type, compression-molded, composite components having improved or enhanced surface appearance.

OVERVIEW

Compression molding has long been used to manufacture plastic parts or components. While widely used to manufacture thermoset plastic parts, compression molding is also used to manufacture thermoplastic parts. The raw materials for compression molding are typically placed in an open, heated mold cavity. The mold is then closed and pressure is applied to force the materials to fill up the entire cavity. A hydraulic ram or punch is often utilized to produce sufficient force during the molding process. The heat and pressure are maintained until the plastic materials are cured.

Two types of plastic compounds frequently used in compression molding are Bulk Molding Compound (BMC) and Sheet Molding Compound (SMC).

In general, compression molding provides good surface finish and can be applied to composite thermoplastics with woven fabrics, randomly oriented fiber mat or chopped strand. One of the problems associated with compression molding is that compression molding is thought to be largely limited to flat or moderately curved parts with no undercuts.

Vacuum during compression molding of thermoset parts has been used to minimize surface defects of the type known as porosity. Porosity is caused by air that is trapped between the molding compound (i.e. raw materials) and the surface of the mold cavity. The mold chamber or cavity is sealed from the surrounding atmosphere and then the chamber is evacuated before pressure is applied to the raw materials.

Sandwich-type composite panels including cores have very important characteristics because of their light weight and high strength. Conventionally, such panels are constructed by sandwiching a core having a large number of cavities and having low strength characteristics between two outer layers or skins, each of which is much thinner than the core but has excellent mechanical characteristics. The core is often made of cells which may be hexagonal in plan shape and they may be honeycombed. Such cores typically have two mutually parallel and opposite faces that are perpendicular to the axes of the cells as shown in FIGS. 1 and 2.

The prior art discloses a method of making a panel of sandwich-type composite structure having a cellular core in a single processing step. In that method, the panel is made by subjecting a pre-heated stack 10 of layers of material (i.e. FIGS. 1 and 2) to cold-pressing in a mold. The stack is made up of: at least a first skin 14 made of a reinforced thermoplastics material, a cellular core 16 made of a thermoplastics material, and a second skin 18 also made of a reinforced thermoplastics material. The stack 10 may also include one or more external covering layers made of a facing material such as woven or nonwoven thermoplastic material as shown in FIG. 1. The stack 10 may be pre-heated outside the mold or heated inside the mold to a softening temperature.

Such a method is particularly advantageous because of the fact that it makes it possible, in a single operation, to generate cohesion and bonding between the various layers of the composite structure, as shown in FIGS. 2 and 3, and to shape the resulting panel (10 or 10') while preserving all of the mechanical properties imparted by the cellular-core, sandwich structure.

One problem associated with the above-noted method of making a panel of sandwich-type composite structure is that during the cold-pressing in a compression mold 20 (i.e. FIG. 4) one or both of the skins 14 and 18 does not fully contact or achieve abutting engagement with its respective mold half or die 24 during the molding process. Consequently, the resulting compression-molded, composite component 10' fails to achieve the desired component shape, as defined by the opposing surfaces of upper and lower dies 24 and 26. In FIG. 4, distance between arrows 15 represent a distance between the desired and actual shapes of the component 10'.

Also, the air sealed within the cellular core 16 bonded to and between the skins 14 and 18 causes circular portions of one or both of the skins 14 to move inwardly into and towards the cells of the core 16 along the axes of the cells as the air cools. This causes the outer surface 22 of one or both of the skins 14 and 18 to be debossed as shown in FIGS. 2 and 3 at 12. Such effect may be termed an "oil-can" effect and results in a pattern of undesirable depressions or imprints 12 on the outer surface 22 of one or both of the skins 14 and 18 as shown in FIGS. 2 and 3. Such undesirable depressions 12 can even be seen in facing material (not shown in FIGS. 2 and 3 but shown in FIG. 1) bonded to the outer surfaces of the skins 14 and 18 such as covering layers thereby resulting in a poor surface finish.

The term "facing material" refers to a material used to conceal and/or protect structural and/or functional elements from an observer. Common examples of facing materials include upholstery, carpeting, and wall coverings (including stationary and/or movable wall coverings and cubicle wall coverings). Facing materials typically provide a degree of aesthetic appearance and/or feel, but they may also provide a degree of physical protection to the elements that they conceal. In some applications, it is desirable that the facing material provide properties such as, for example, aesthetic appeal (for example, visual appearance and/or feel) and abrasion resistance. Facing materials are widely used in motor vehicle construction.

In the automotive industry, it is common practice to refer to various surfaces as being A-, B-, or C-surfaces. As used herein, the term "A-surface" refers to an outwardly-facing surface for display in the interior of a motor vehicle. This surface is a very high visibility surface of the vehicle that is most important to the observer or that is most obvious to the direct line of vision. With respect to motor vehicle interiors, examples include dashboards, instrument panels, steering wheels, head rests, upper seat portions, headliners, load floors and pillar coverings.

The following U.S. patent documents are related to at least one embodiment of the present invention: U.S. Pat. Nos. 5,370,521; 5,502,930; 5,915,445; 6,050,630; 6,102,464; 6,435,577; 6,537,413; 6,655,299; 6,682,675; 6,682, 676; 6,748,876; 6,790,026; 6,823,803; 6,843,525; 6,890,023; 6,981,863; 7,090,274; 7,419,713; 7,909,379; 7,919,031; 8,117,972; 2005/0189674, 2006/0255611; 2008/0185866; and 2011/0315310.

SUMMARY OF EXAMPLE EMBODIMENTS

An object of at least one embodiment of the present invention is to provide a method of making sandwich-type, compression-molded, composite components having enhanced or improved overall surface appearance or finish.

In carrying out the above object and other objects of at least one embodiment of the present invention, a method of making a sandwich-type, compression-molded, composite component having improved surface appearance is provided. The method includes heating a blank or stack of sandwich material including first and second resin skins and a core positioned between the skins and having a large number of cavities. The skins and the core are heated to a softening temperature of the resin. A compression mold is provided which includes component-forming, upper and lower dies with opposing molding surfaces cooperating to define a mold cavity having a shape substantially corresponding to a desired shape of the component. The blank or stack is placed on the lower die in an open position of the mold. The dies are moved toward each other until the mold is in a closed position. The heated blank or stack is allowed to cool in the mold cavity in the closed position until inner surfaces of the skins are bonded to top and bottom surfaces of the core to seal the core cavities. Air in the sealed cavities urges softened portions of the skins inwardly towards the cavities of the core as the air in the cavities cools. A vacuum is applied at a first outer surface of the blank or stack in the mold cavity sufficient to prevent debossing and improve appearance of the first outer surface during the step of allowing.

The first outer surface may be an A-surface.

The method may further include sealing the mold cavity from the surrounding atmosphere during the step of applying.

The method may further include applying a vacuum at a second outer surface of the stack or blank in the mold cavity to prevent debossing and improve appearance of the second outer surface during the step of allowing.

The core may be a cellular core such a honeycomb core.

The skins may be reinforced thermoplastic skins such as fiber reinforced skins.

The core may be a thermoplastic resin core wherein the thermoplastic of the skins and the core is polypropylene.

The component may have a thickness in the range of 5 to 25 mm.

At least one of the skins may be a woven skin.

The step of heating may be performed outside the mold.

Further in carrying out the above object and other objects of at least one embodiment of the present invention, a method of making a sandwich-type, compression-molded, composite component having improved surface appearance and for use in a vehicle is provided. The method includes heating a blank or stack of sandwich material including first and second resin skins and a core positioned between the skins and having a large number of cavities. The skins and the core are heated to a softening temperature of the resin. A compression mold is provided which includes component-forming, upper and lower dies with opposing surfaces cooperating to define a mold cavity having a shape substantially corresponding to a desired shape of the component. The blank or stack is placed on the lower die in an open position of the mold. The dies are moved toward each other until the mold is in a closed position. The heated blank or stack is allowed to cool in the mold cavity in the closed position until inner surfaces of the skins are bonded to top and bottom surfaces of the core to seal the core cavities. Air in the sealed cavities urges softened portions of the skins inwardly towards the cavities of the core as the air in the cavities cools. A vacuum is applied at a first outer surface of the stack or blank in the mold cavity sufficient to prevent debossing and improve appearance of the first outer surface during the step of allowing.

The first outer surface may be an A-surface.

The method may further include sealing the mold cavity from the surrounding atmosphere during the step of applying.

The method may further include applying a vacuum at a second outer surface of the stack or blank in the mold cavity to prevent debossing and improve appearance of the second outer surface during the step of allowing.

Still further in carrying out the above object and other objects of at least one embodiment of the present invention, a method of making a sandwich-type, compression-molded, composite component having improved surface appearance for use in the interior of a vehicle is provided. The method includes heating a blank or stack of sandwich material including first and second resin skins and a resin core positioned between the skins and having a large number of cavities. The skins and the core are heated to a softening temperature of the resins. A compression mold is provided which includes component-forming, upper and lower dies with opposing molding surfaces cooperating to define a mold cavity having a shape substantially corresponding to a desired shape of the component. The blank or stack is placed on the lower die in an open position of the mold. The dies are moved toward each other until the mold is in a closed position. The heated blank or stack is allowed to cool in the mold cavity in the closed position until inner surfaces of the skins are bonded to top and bottom surfaces of the core to seal the core cavities. Air in the sealed cavities urges softened portions of the skins inwardly towards the cavities of the core as the air in the cavities cools. A vacuum as applied at a first outer surface of the stack or blank in the mold cavity sufficient to prevent debossing and improve appearance of the first outer surface during the step of allowing.

The first outer surface may be an A-surface.

The method may further include sealing the mold cavity from the surrounding atmosphere during the step of applying.

The method may further include applying a vacuum at a second outer surface of the stack or blank in the mold cavity to prevent debossing and improve appearance of the second outer surface during the step of allowing.

Other technical advantages will be readily apparent to one skilled in the art from the following figures, descriptions and claims. Moreover, while specific advantages have been enumerated, various embodiments may include all, some or none of the enumerated advantages.

DETAILED DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 5:
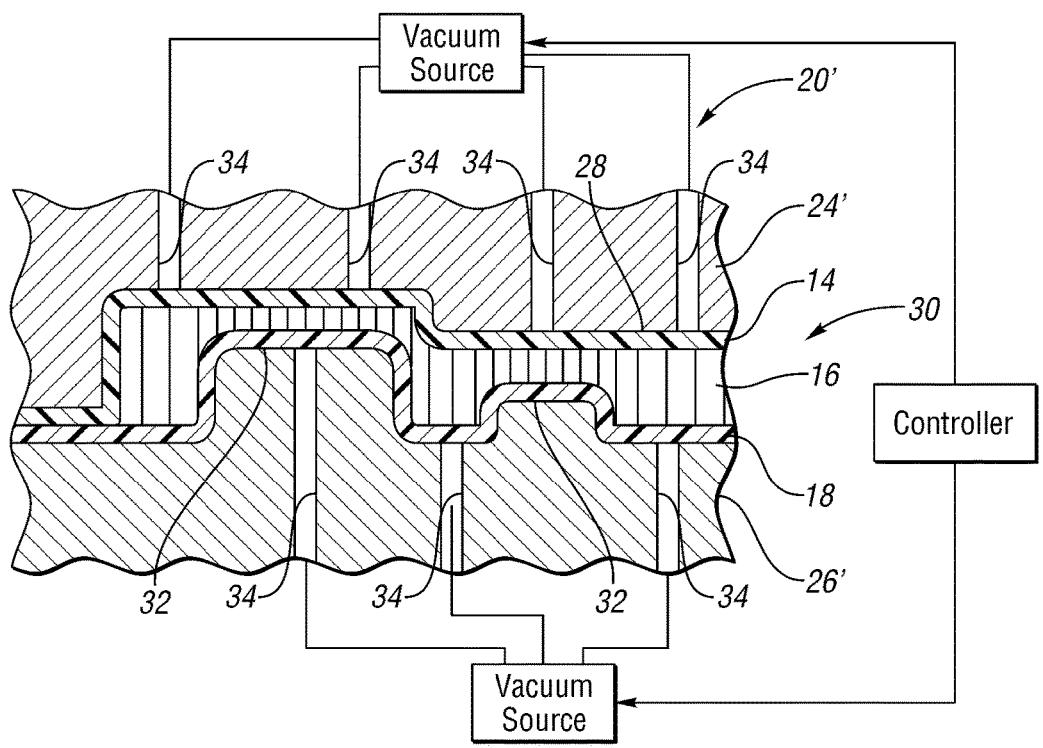
FIG. 5 is a view, similar to the view of FIG. 4, but showing a vacuum-assisted compression mold useful in at least one method embodiment of the present invention to improve the surface appearance of the resulting component.

FIG. 5 shows a compression-molded, composite component, generally indicated at 30, which may be used in a vehicle load floor assembly, positioned or supported at the rear of an automotive vehicle. The composite component 30 has a sandwich structure. The composite component 30 includes a load-bearing, first outer skin or layer 14 having an A-surface 28, a second outer skin or layer 18 having a surface 32, and a core 16 positioned between and bonded to the outer layers 14 and 18. The core 16 has a large number of cavities and is preferably a thermoplastic core 16. The outer layers 14 and 18 are bonded to the core 16 by press molding in a mold 20' typically after pre-heating the outer layers 14 and 18 and the core 16 outside the mold 20'. The outer layers 14 and 18 are preferably fiber-reinforced thermoplastic layers. The thermoplastic of the layers 14 and 18 and the core 16 may be a polyolefin such as polypropylene. The thermoplastic may alternatively be polyurethane. The fiber-reinforcement may be a glass mat, a natural fiber mat, or a woven or non-woven mat.

The core 16 may be a cellular core having a honeycomb structure. The core 16 may also be made of polypropylene honeycomb, aluminum honeycomb, balsa and polyurethane foam. The resulting composite component or panel 30 typically includes a lightweight, low density core such as the core 16 together with fiber-reinforced thermoplastic skins or layers such as the skins 14 and 18. The resulting component 30 is not debossed and has an improved, overall appearance unlike the components 10 and 10' of FIGS. 2 and 3, respectively.

The composite component 30 may be compression or press molded using a variety of technologies which use a low temperature, compression-molding apparatus but preferably uses the molding apparatus of FIG. 5. The core 16 and the skins 14 and 18 are preferably generally of the type shown in U.S. Pat. Nos. 6,537,413; 6,050,630; and 2005/0189674.

Each resulting panel or component 30 may have a thickness in the range of 5 to 25 mm.

In one example method of making the component 30, a stack of material is pressed in the low pressure, cold-forming mold 20' which has upper and lower forming dies 24' and 26', respectively. The mold 20' is shown in its closed position in FIG. 5 but it is to be understood that the blank or stack of materials is placed on the lower die 26' in the open position of the mold 20' prior to cold pressing.

The stack is made up of the first layer or skin 14, the cellular core 16 and the second layer or skin 18. The stack is pressed at a pressure lying in the range of $10 \times 10^5$ Pa. to $30 \times 10^5$ Pa. The first and second skins 14 and 18, respectively, are preferably pre-heated to make them malleable and stretchable. Advantageously, in order to soften the first and second skins 14 and 18, respectively, heat is applied to a pre-assembly constituted by the stack made up of at least the first skin 14, of the cellular core 16, and the second skin 18 so that, while the component 30 is being formed in the mold 20', the first and second skins 14 and 18 have a forming temperature lying approximately in the range of 160° C. to 200° C., and, in this example, about 180° C.

Figure 1:
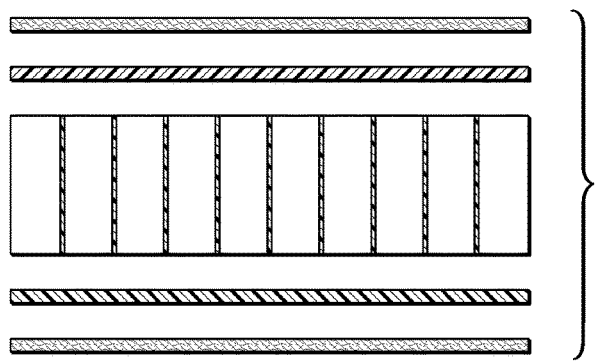
FIG. 1 is a side sectional view showing various separate layers of a prior art stack or blank of thermoplastic-based layers of material.
Figure 2:
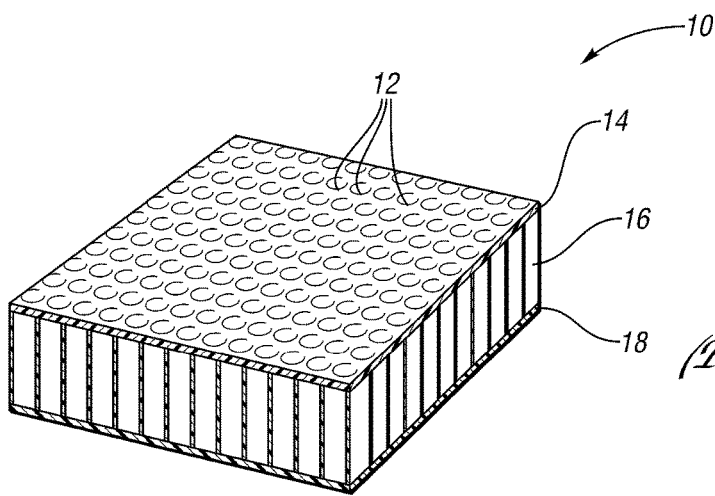
FIG. 2 is a top perspective sectional view of the stack of FIG. 1 but without outer carpet layers after low-pressure, cold compression molding of the prior art.
Figure 3:
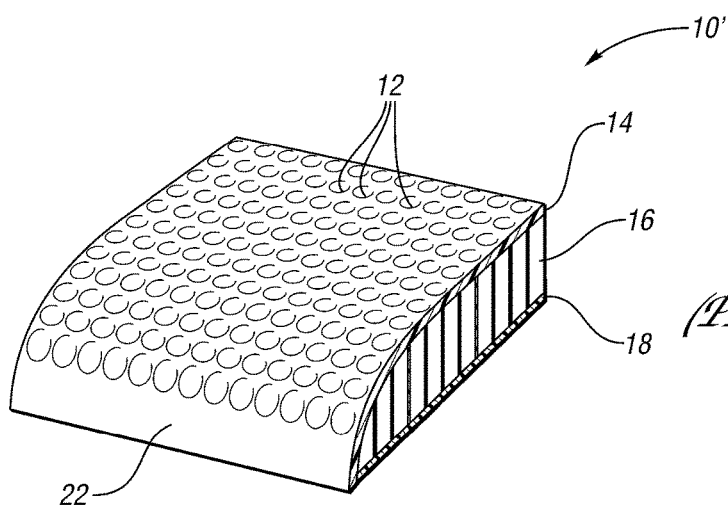
FIG. 3 is a view, similar to the view of FIG. 2, of an edge portion of the molded component.
Figure 4:
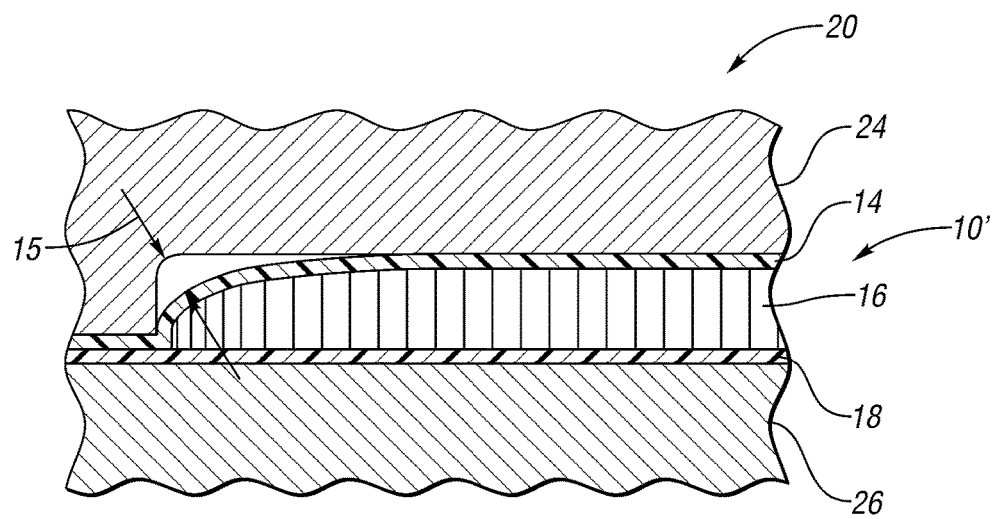
FIG. 4 is a view, partially broken away and in cross section, of the component of FIG. 3 during compression molding in accordance with the prior art.

The heated blank or stack is allowed to cool in the mold cavity of FIG. 5 in the closed position of the mold 20' until inner surfaces of the skins 14 and 18 are bonded to top and bottom surfaces of the core 16 to seal the cavities of the core 16. The air in the sealed cavities normally urges softened portions of the skins 14 and 18 inwardly into and towards the cavities of the core 16 as the air in the cavities cools. A vacuum is applied at the first outer surface 28 of the blank or stack by an upper vacuum source through holes or passageways 34 formed through the upper die 24' of the mold 20' sufficient to prevent debossing (as shown in FIGS. 2 and 3) during the cooling and improve appearance of the first outer surface 28. Vacuum is applied by the upper vacuum source under control of a controller.

In like fashion, a vacuum is applied at the second outer surface 32 of the stack or blank by a lower vacuum source through holes or passageways 34 formed through the lower die 26' of the mold 20' to prevent debossing during the cooling and improve appearance of the second outer surface 32. Vacuum is applied by the lower vacuum source under control of the controller.

The mold cavity of the mold 20' is preferably sealed from the atmosphere surrounding the mold 20' during the application of the vacuum at the upper and lower surfaces 28 and 32, respectively, by one or both of the skins 14 and 18 or by a separate, conventional seal (not shown) between the dies 24' and 26' of the mold 20'.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of making a sandwich-type, compression-molded, composite component having improved surface appearance, the method comprising:

heating a blank or stack of sandwich material including first and second resin skins and a core positioned between the skins and having a large number of cavities, the skins and the core being heated to a softening temperature of the resin;

providing a compression mold including component-forming, upper and lower dies with opposing molding surfaces cooperating to define a mold cavity having a shape substantially corresponding to a desired shape of the component;

placing the blank or stack on the lower die in an open position of the mold;

moving the dies toward each other until the mold is in a closed position;

allowing the heated blank or stack to cool in the mold cavity in the closed position until inner surfaces of the skins are bonded to top and bottom surfaces of the core to seal the core cavities, air in the sealed cavities urging softened portions of the skins inwardly towards the cavities of the core as the air in the cavities cools; and applying a vacuum at a first outer surface of the blank or stack in the mold cavity sufficient to prevent debossing and improve appearance of the first outer surface during the step of allowing.

2. The method as claimed in claim 1, wherein the first outer surface is an A-surface.

3. The method as claimed in claim 1, further comprising sealing the mold cavity from the surrounding atmosphere during the step of applying.

4. The method as claimed in claim 1, further comprising applying a vacuum at a second outer surface of the stack or blank in the mold cavity to prevent debossing and improve appearance of the second outer surface during the step of allowing.

5. The method as claimed in claim 1, wherein the core is a cellular core.

6. The method as claimed in claim 5, wherein the cellular core is a honeycomb core.

7. The method as claimed in claim 1, wherein the skins are reinforced thermoplastic skins.

8. The method as claimed in claim 7, wherein each of the skins is fiber reinforced.

9. The method as claimed in claim 7, wherein the core is a thermoplastic resin core and wherein the thermoplastic of the skins and the core is polypropylene.

10. The method as claimed in claim 1, wherein the component has a thickness in the range of 5 to 25 mm.

11. The method as claimed in claim 1, wherein at least one of the skins is a woven skin.

12. The method as claimed in claim 1, wherein the step of heating is performed outside the mold.

13. A method of making a sandwich-type, compression-molded, composite component having improved surface appearance and for use in a vehicle, the method comprising:

heating a blank or stack of sandwich material including first and second resin skins and a core positioned between the skins and having a large number of cavities, the skins and the core being heated to a softening temperature of the resin;

providing a compression mold including component-forming, upper and lower dies with opposing molding surfaces cooperating to define a mold cavity having a shape substantially corresponding to a desired shape of the component;

placing the blank or stack on the lower die in an open position of the mold;

moving the dies toward each other until the old is in a closed position;

allowing the heated blank or stack to cool in the mold cavity in the closed position until inner surfaces of the skins are bonded to top and bottom surfaces of the core to seal the core cavities, air in the sealed cavities urging softened portions of the skins inwardly towards the cavities of the core as the air in the cavities cools; and applying a vacuum at a first outer surface of the stack or blank in the mold cavity sufficient to prevent debossing and improve appearance of the first outer surface during the step of allowing.

14. The method as claimed in claim 13, wherein the first outer surface is an A-surface.

15. The method as claimed in claim 13, further comprising sealing the mold cavity from the surrounding atmosphere during the step of applying.

16. The method as claimed in claim 13, further comprising applying a vacuum at a second outer surface of the stack or blank in the mold cavity to prevent debossing and improve appearance of the second outer surface during the step of allowing.

17. A method of making a sandwich-type, compression-molded, composite component having improved surface appearance for use in the interior of a vehicle, the method comprising:

heating a blank or stack of sandwich material including first and second resin skins and a resin core positioned between the skins and having a large number of cavities, the skins and the core being heated to a softening temperature of the resins;

providing a compression mold including component-forming, upper and lower dies with opposing molding surfaces cooperating to define a mold cavity having a shape substantially corresponding to a desired shape of the component;

place the blank or stack on the lower die in an open position of the mold;

moving the dies toward each other until the mold is in a closed position;

allowing the heated blank or stack to cool in the mold cavity in the closed position until inner surfaces of the skins are bonded to top and bottom surfaces of the core to seal the core cavities, air in the sealed cavities urging softened portions of the skins inwardly towards the cavities of the core as the air in the cavities cools; and applying a vacuum at a first outer surface of the stack or blank in the mold cavity sufficient to prevent debossing and improve appearance of the first outer surface during the step of allowing.

18. The method as claimed in claim 17, wherein the first outer surface is an A-surface.

19. The method as claimed in claim 17, further comprising sealing the mold cavity from the surrounding atmosphere during the step of applying.

20. The method as claimed in claim 17, further comprising applying a vacuum at a second outer surface of the stack or blank in the mold cavity to prevent debossing and improve appearance of the second outer surface during the step of allowing.

* * * * *

UNITED STATES PATENT AND TRADEMARK OFFICE
CERTIFICATE OF CORRECTION

PATENT NO. : 9,770,849 B2  
APPLICATION NO. : 13/762956  
DATED : September 26, 2017  
INVENTOR(S) : Darius J. Preisler et al.

Page 1 of 1

It is certified that error appears in the above-identified patent and that said Letters Patent is hereby corrected as shown below:

In the Claims

Column 7, Line 55, Claim 13:
After "moving the dies toward each other until the"
Delete "old" and
Insert -- mold --.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*